United States Patent Office 3,218,270
Patented Nov. 16, 1965

3,218,270
CROSS-LINKING OF POLYMERS FROM PERFLUORODIAMIDINES AND PERFLUOROMONOAMIDINES
Alvin D. Delman, Plainview, Alban E. Ruff, New York, and Bernard B. Simms, Franklin Square, N.Y., assignors to the United States of America as represented by the Secretary of the Navy
No Drawing. Filed Aug. 27, 1963, Ser. No. 305,013
1 Claim. (Cl. 260—2)
(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of application Serial No. 847,675, filed October 19, 1959, and now abandoned.

This invention relates to the cross-linking of rubber-like polymers to obtain a dielectric product that will withstand very high temperatures. Recent advances in rocket and guided missile type of ordnance have made necessary elastomeric, dielectric materials that will withstand the ultra-high temperatures resulting from aerodynamic heating and energy conversion processes associated with high speed flight, where the operational temperature extremes are beyond the capabilities of many of the currently available materials. Elastomers in use today as high-temperature dielectrics, such as the silicones, fluorocarbon polymers such as polytetrafluoroethylene, and copolymers such as chlorotrifluoroethylene-vinylidene fluoride and vinylidene fluoridehexafluoropropylene, are not considered suitable for use at temperatures much above 250° C., yet the need for elastomers that will withstand temperatures well above 250° C. has been increasing.

An object of the invention is to provide a suitable cure system for converting crude elastomeric polymers into elastomeric compounds that will have desired high temperature performance, and dielectric characteristics.

A further object is to provide an elastomeric dialectric compound that will withstand the high temperatures encountered in high speed space flights, which will be relatively inexpensive to manufacture, and to provide a relatively simple, practical and inexpensive method for producing such a dielectric compound.

Other objects and advantages will be apparent from the following disclosure of examples of the invention, and the novel features will be particularly pointed out hereinafter in connection with the accompanying claim.

We have discovered that fluorocarbonamidine polymers have active groups in the polymer segments which may serve as cross-linking sites, and when cross-linked with the use of a cross-linking agent and heat will provide an elastomeric dielectric product having desired high heat performance characteristics.

Specifically, the invention is concerned with the cross-linking of rubbery synthetic polymers, especially of the class consisting of copolymers from the reaction of the monomers of type (A) and (B)

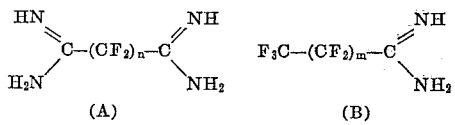

where $n$ is 2, 3, or 4 and $m$ is 2 or 3. The copolymers from the reaction of such monomers have been known. H. C. Brown, Florida University (private communication) prepared the copolymer designated herein as 280 by heating a mixture consisting of 10.00 gms. (0.0424 mole) of perfluroglutarodiamidine (PFB-diamidine) and 14.38 gms. (0.0677 mole) of perfluorobutyromonoamidine (PFB-amidine) over a period of 11 minutes to 226° C. The temperature was increased during the next 60 minutes to 354° C. At this point the reaction mixture is very viscous and evolution of gas is slow. The cold finger condenser was removed and the pressure in the apparatus removed by direct connection to a water aspirator. Initial boiling of the reaction product was violent under reduced pressure, but quieted considerably after 10 minutes and an increase in temperature to 402° C. Then, the reaction vessel was heated briefly with a bare flame to remove some residual liquid and yield 15.5 gms. of pale, yellow, gummy resin. Brown (University of Florida Twentieth Status Report, Contract Nonr–580(03); NR 356–333, January 1, 1958) similarly prepared copolymers from PFB-amidine and perfluoroadipodiamidine (PFA-diamidine) as listed in Table A.

TABLE A

| Run | Reactants | | Molar Ratio PFB-Amidine/PFA-Diamidine | Copolymer | |
|---|---|---|---|---|---|
| | PFB-Amidine g. | PFA-Diamidine, g. | | Yield, g. | Description |
| 284 | 11.90 | 10.00 | 1.60/1.00 | 14.3 | Dark gum. |
| 285 | 11.50 | 10.00 | 1.55/1.00 | 15.6 | Viscous tacky liquid. |
| 286 | 10.00 | 10.00 | 1.35/1.00 | 14.8 | Elastic, tacky amber colored solid. |
| 287 | 20.00 | 20.00 | 1.35/1.00 | 32.5 | Elastomeric tacky solid. |
| 288 | 20.00 | 20.00 | 1.35/1.00 | 32.5 | Eslatomeric tacky solid. |

The copolymer designated herein as 289 was prepared by Brown by mixing the products from runs 286, 287 and 288 with heating and stirring.

The monomers (A) and (B) condense to form polymers containing the structure

Formula C

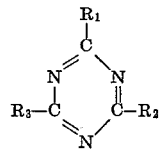

where $R_1$ may be

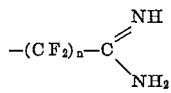

or $(CF_2)_m$—$CF_3$, $R_2$ and $R_3$ may be a —$(CF_2)_n$— chain connected to another triazine ring or

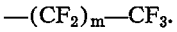

—$(CF_2)_m$—$CF_3$.

Thermoplastic polymers can be made so soften and take on new shapes by the application of heat and pressure. In contrast, polymers with a crosslinked network extending throughout the whole of the final article are more stable to heat, cannot be made to flow, and have increased strength. In this sense, crosslinking of polymers through chemical reactions between molecules makes them more useful. In general, a three dimensional structure is imparted by a curing or cross-linking process whereby two or more chains or structural fragments are interconnected by means of condensation or addition reactions with difunctional or polyfunctional reagents or curatives. In selecting specific types of chemicals for use as cross-links between the molecular segments, the polymer chemist is guided by the nature of the reactive sites in the polymer structure. Work on these elastomeric polymers disclosed the presence of pendant amidine groups,

By reaction of these groups with di- and polyfunctional chemicals, the polymers may become crosslinked and the properties of the polymeric body may be altered as desired or as conditions may require. For example, di- and polyfunctional compounds with amino, epoxido, isocyanato, amidino, amido, nitrilo, etc. groups may be interacted with the polymeric bodies described by Formula C, when $R_1$ is

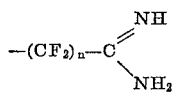

in the following manner:

Diamine:

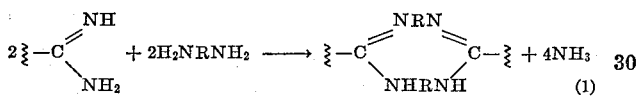 (1)

Mono-substituted diamine:

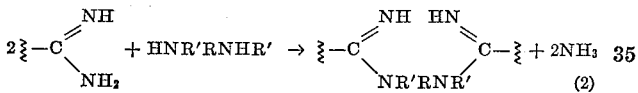 (2)

Epoxidation:

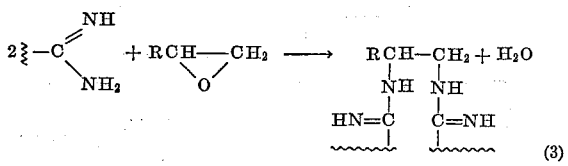 (3)

Diisocyanate:

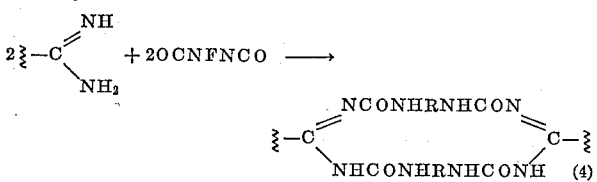 (4)

Diamidine monomer:

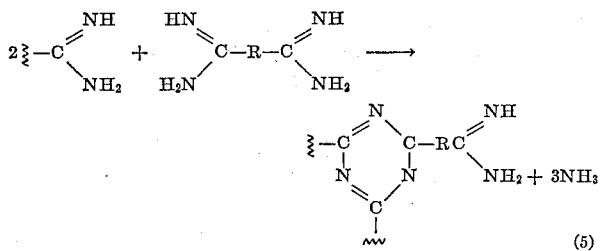 (5)

Diamide:

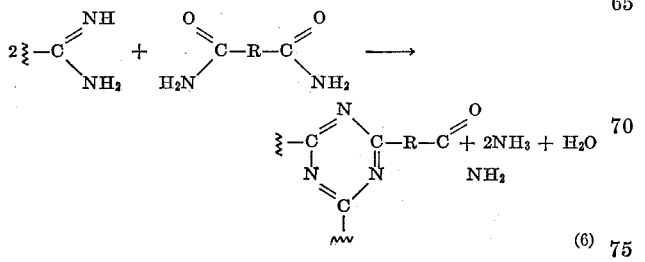 (6)

Dinitrile:

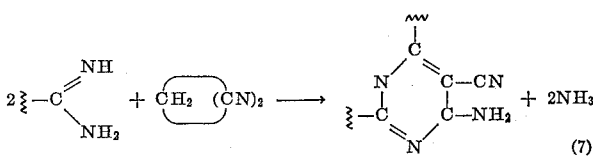 (7)

wherein

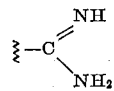

represents a repeating unit of the perfluoro-carbonamidine polymer which contains an amidine group, and where R and R' denote alkyl, aryl, alkaryl, and aralkyl substituent groups of the crosslinking agents. In addition to the crosslinking reaction mechanisms of this invention, the polymer represented by Formula C may undergo heat induced cross-linking through a triazine ring formation, as follows:

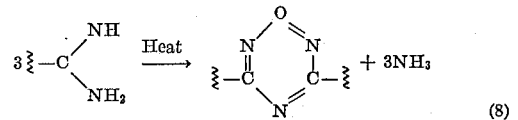 (8)

where the adjacent-polymer-chains apparently react to produce one three-dimensional molecule.

In these formulae, the lines $\}$ represent the elastomeric molecules.

Illustrative examples of di-and polyfunctional chemicals that are useful as crosslinking agents for the polymeric bodies described in Formula C, as shown by the chemical reactions in Equations 1 through 7, are the amino compounds, (e.g., p-phenylenediamine, triethylenetetramine, N,N'-dimethyl-p-phenylenediamine, benzidine, monohydroxyethyltrihydroxypropylethylenediamine, hexamethylenediamine carbamate, etc.); the epoxido compounds, (e.g., 1,2-epoxyethyl benzene, dicyclopentadiene dioxide, limonene dioxide, dipentene dioxide, α-pinene oxide, etc.); the isocyanato chemicals, (e.g., diphenylmethane-4,4'-diisocyanate, 3,3' - dimethyldiphenylmethane-4,4'-diisocyanate, etc.); the amidino compounds, (e.g., perfluoroglutarodiamidine, perfluoroadipodiamidine, etc.); the amido chemicals, (e.g., adipamide, succinamide, etc.); and the nitrilo compounds, (e.g., malonitrile, glutaronitrile, etc.).

The degree of cross-linking attained by these cured specimens was considered to be reflected by variation in their solubility, such as in acetone, methyl alcohol, toluene, chloroform, etc. For this purpose, insolubility in acetone was determined by repeatedly extracting, at room temperature, 0.10 gram of "cured" specimen, using approximately 2 ml. portions of acetone until no further extractable matter was removed. The amount of insoluble residue was obtained by direct weighing, correcting for acetone-insoluble curing agent, and calculating the percentage on the basis of the original polymer weight. Similar procedures using other organic solvents were also employed.

To illustrate the increased degree of crosslinking possible when empolying the di- and polyfunctional chemicals of this invention, the information on the effects of heat alone on the polymeric bodies described by Formula C is presented in Table 1 for comparison purposes only.

TABLE 1
*Effects of heat on the CFN polymers*

| Polymer | Platen Conditions | | Acetone Soluble (percent) | Degree of Cross-linking (Acetone Insol., percent) | Volatile (percent) |
|---|---|---|---|---|---|
| | Temperature (° F.) | Time (min.) | | | |
| 289 | 75 | | 56.0 | 44.0 | 0.0 |
| 289 | 400 | 15 | 51.7 | 26.1 | 22.2 |
| 289 | 500 | 15 | 47.9 | 32.2 | 19.9 |
| 289 | 600 | 15 | 40.6 | 48.6 | 10.8 |
| 289 | 500 | 30 | 44.4 | 34.9 | 20.7 |
| 289 | 500 | 60 | 41.2 | 39.8 | 19.0 |
| 289 | 500 | 120 | 32.4 | 45.8 | 21.8 |
| 280 | 75 | | 59.5 | 40.5 | 0 |
| 280 | 400 | 15 | 42.9 | 54.4 | 2.7 |

In order that those skilled in the art better may understand how the present invention may be carried into effect, the following illustrative examples thereof are given. The mixtures were cured in a brass mold, which yielded specimen discs, approximately 0.25 in I.D. by 0.062 in. thick, using a hydraulic press operating over a platen temperature range of 75–600° F. at 4,000 p.s.i. (pounds per square inch) for about 5 to 180 minutes. All parts are by weight (P.H.R.=parts per hundred parts of rubber, which in this invention are the polymeric bodies described by Formula C).

EXAMPLES 1–10

The examples in Table 2 illustrate the crosslinking action of specific amino compounds on particular polymeric bodies represented by Formula C. Examples 1 and 9 are given for comparison purposes only.

TABLE 2
*Cross-linking properties of di- and polyfunctionl amines*

| Example | Polymer | Reagent (5 P.H.R.) | Platen Conditions | | Degree of Cross-Linking (Percent Acetone Insoluble) |
|---|---|---|---|---|---|
| | | | Temperature (° F.) | Time (min.) | |
| 1 | 289 | None | 500 | 15 | 32.2 |
| 2 | 289 | p-Phenylenediamine | 500 | 15 | 60.1 |
| 3 | 289 | Benzidine | 500 | 15 | 53.6 |
| 4 | 289 | Triethylenetetramine | 500 | 15 | 60.1 |
| 5 | 289 | Hexamethylenediamine Carbamate | 400 | 15 | 46.4 |
| 6 | 289 | ...do... | 400 | 15 | ¹ 61.3 |
| 7 | 289 | Monohydroxyethyltrihydroxyethelenediamine | 400 | 15 | 33.8 |
| 8 | 289 | N,N'Dimethyl-p-phenylene diamine | 400 | 15 | ¹ 58.1 |
| 9 | 280 | None | 400 | 15 | 54.4 |
| 10 | 280 | Hexamethylenediamine Carbamate | 400 | 15 | ¹ 75.1 |

¹ After press-cross-linking, specimens were oven aged for 24 hours at 400° F.

EXAMPLES 11–15

These examples illustrate the effects of amino compound concentrattion on the degree of crosslinking which can be produced in particular polymeric bodies represented by Formula C. Example 11 is given for comparison puropses only.

TABLE 3
*Effects of p-phenylenediamine concentration on the dedegree of cross-linking of polymer No. 289 (600° F. for 15 min.)*

| Examples | Reagent Concentration (P.H.R.p-Phenylenediamine) | Degree of Cross-Linking (Percent Acetone Insoluble) |
|---|---|---|
| 11 | 0.0 | 48.6 |
| 12 | 2.5 | 50.5 |
| 13 | 5.0 | 63.6 |
| 14 | 10.0 | 67.3 |
| 15 | 15.0 | 67.8 |

EXAMPLES 16–17

The examples of Table 4 show the effects of temperature on the degree of crosslinking in particular polymeric bodies represented by Formula C as produced by amino chemical.

TABLE 4
*Effect of platen temperature on degree of cross-linking of polymer No. 289 (5 P.H.R. of p-phenylenediamine for 15 min.)*

| Examples | Platen Temperature (° F.) | Degree of Cross-Linking (Percent Acetone Insoluble) |
|---|---|---|
| 16 | 400 | 32.9 |
| 4 | 500 | 60.1 |
| 17 | 600 | 63.6 |

EXAMPLES 18–20

These examples illustrate the effects of heating time on the degree of crosslinking produced by an amino chemical on particular polymeric bodies represented by Formula C.

TABLE 5
*Effects of heating time on degree of cross-linking polymer No. 289 (5 P.H.R. of p-phenylenediamine at 500° F).*

| Examples | Heating Time (min.) | Degree of Cross-Linking (Percent Acetone Insoluble) |
|---|---|---|
| 18 | 5 | 34.5 |
| 19 | 10 | 42.0 |
| 4 | 15 | 60.1 |
| 20 | 30 | 60.5 |

EXAMPLES 21–28

The examples listed in Table 6 show the effects of epoxido compounds on the degree of crosslinking in particular polymeric bodies represented by Formula C. Examples 21 and 27 are given for comparison purposes only.

TABLE 6
Cross-linking properties of epoxy compounds

| Examples | Polymer | Reagent (5 P.H.R.) | Cure Time (min.) | Cure Temperature (° F.) | Degree of Cross-Linking (Percent Acetone Insoluble) |
|---|---|---|---|---|---|
| 21 | 289 | None | 60 | 500 | 39.8 |
| 22 | 289 | 1,2-epoxyethyl Benzene | 60 | 500 | 50.2 |
| 23 | 289 | Dicyclopentadiene Dioxide | 60 | 500 | 52.2 |
| 24 | 289 | Limonene Dioxide | 60 | 500 | 52.3 |
| 25 | 289 | Limonene Monoxide (Dipentene Dioxide). | 60 | 500 | 52.2 |
| 26 | 289 | Alpha-Pinene Oxide | 60 | 500 | 52.2 |
| 27 | 280 | None | | 75 | 40.5 |
| 28 | 280 | 1,2-epoxyethyl Benzene | 120 | 500 | 66.4 |

EXAMPLES 29–32

These examples illustrate the influence of epoxido compound concentrattion on the degree of crosslinking produced in particular polymeric bodies represented by Formula C.

TABLE 7
*Effects of 1,2-epoxyethyl benzene concentration on degree of cross-linking of polymer #289 (500° F. for 60 min.)*

| Examples | Reagent Concentration | Degree of Cross-Linking (Percent Acetone Insoluble) |
|---|---|---|
| 21 | 0.0 | 39.8 |
| 29 | 2.5 | 43.1 |
| 22 | 5.0 | 50.2 |
| 30 | 10.0 | 50.0 |
| 31 | 15.0 | 50.0 |
| 32 | 20.0 | 51.1 |

EXAMPLES 33–35

These examples illustrate the effects of temperature on the degree of crosslinking produced by epoxido compounds on particular polymeric bodies represented by Formula C.

TABLE 8
*Effects of platen temperature on degree of cross-linking of polymer #289 (5 P.H.R. 1,2-epoxyethyl benzene for 120 min.)*

| Examples | Platen Temperature (° F.) | Degree of Cross-Linking (Percent Acetone Insoluble) |
|---|---|---|
| 33 | 400 | 47.6 |
| 34 | 500 | 52.7 |
| 35 | 600 | 75.9 |

EXAMPLES 36–38

The examples of Table 9 illustrate the effects of time on the crosslinking of particular polymeric bodies represented by Formula C by epoxido compounds.

TABLE 9
*Effects of heating time on degree of cross-linking polymer #289 (5 P.H.R. of 1,2-epoxyethyl benzene at 500° F.)*

| Examples | Heating Time (min.) | Degree of Cross-Linking (Percent Acetone Insoluble) |
|---|---|---|
| 36 | 30 | 46.2 |
| 22 | 60 | 50.2 |
| 37 | 120 | 52.7 |
| 38 | 180 | 55.0 |

EXAMPLES 39–42

These examples illustrate the degree of crosslinking induced in particular polymeric bodies represented by Formula C by addition of isocyanato chemicals. Examples 27 and 39 are shown for comparison purposes only.

TABLE 10
Cross-linking properties of diisocyanate compounds

| Examples | Polymer | Reagent (5 P.H.R.) | Cure Time (min.) | Cure Temperature (° F.) | Degree of Cross-Linking (Percent Acetone Insoluble) |
|---|---|---|---|---|---|
| 39 | 289 | None | 30 | 500 | 34.9 |
| 40 | 289 | Diphenylmethane-4,4' Diisocyanate. | 30 | 500 | 40.8 |
| 41 | 289 | 3,3'Dimethyldiphenylmethane-4,4'Diisocyanate. | 30 | 500 | 38.6 |
| 27 | 280 | None | | 75 | 40.5 |
| 42 | 280 | Diphenylmethane-4,4'Diisocyanate. | 180 | 500 | 64.4 |

EXAMPLES 43–47

These examples show the effects of isocyanato chemical concentrations on the degree of crosslinking produced in particular polymeric bodies represented by Formula C. Example 21 is given for comparison purposes only.

TABLE 11
*Effects of diphenylmethane-4,4'-diisocyanate concentration on degree of cross-linking of polymer No. 289 (500° F. for 60 min.)*

| Examples | Reagent Concentration | Degree of Cross-Linking (Percent Acetone Soluble) |
|---|---|---|
| 21 | 0.0 | 39.8 |
| 43 | 2.5 | 44.7 |
| 44 | 5.0 | 43.1 |
| 45 | 10.0 | 44.1 |
| 46 | 15.0 | 52.9 |
| 47 | 20.0 | 52.5 |

EXAMPLES 48 AND 49

Table 12 presents examples which illustrate the effects of temperature on the degree of crosslinking produced by isocyanato chemicals in particular polymeric bodies represented by Formula C.

TABLE 12

*Effects of platen temperature on degree of cross-linking of polymer #289 (5 P.H.R. diphenylmethane-4,4'-diisocyanate)*

| Examples | Platen Temperature (° F.) | Degree of Cross-Linking (Percent Acetone Insoluble) |
|---|---|---|
| 48 | 400 | 32.3 |
| 40 | 500 | 40.8 |
| 49 | 600 | 60.7 |

EXAMPLES 50-52

These examples illustrate the effects of heating time on the degree of crosslinking produced by isocyanato compounds in particular polymeric bodies represented by Formula C.

TABLE 13

*Effects of heating time on degree of cross-linking polymer No. 289 (5 P.H.R. of diphenylmethane-4,4'-diisocyanate at 500° F.)*

| Examples | Heating Time (min.) | Degree of Cross-Linking (Percent Acetone Insoluble) |
|---|---|---|
| 40 | 30 | 40.8 |
| 50 | 60 | 43.1 |
| 51 | 120 | 49.1 |
| 52 | 180 | 52.9 |

EXAMPLES 53-58

These examples show the effects of amidino compound concentrations on the degree of crosslinking of particular polymeric species represented by Formula C. Example 53 is given for comparison purposes only.

TABLE 14

*Effects of perfluorogultarodiamidine monomer concentration on degree of cross-linking of polymer #289 (500° F. for 120 min.)*

| Examples | Reagent Concentration (P.H.R.) | Degree of Cross-Linking (Percent Acetone Insoluble) |
|---|---|---|
| 53 | 0.0 | 45.8 |
| 54 | 2.5 | 53.4 |
| 55 | 5.0 | 66.6 |
| 56 | 10.0 | 62.0 |
| 57 | 15.0 | 64.3 |
| 58 | 20.0 | 29.7 |

EXAMPLES 59-61

The effects of temperature on the degree of crosslinking produced by amidino compounds in particular polymeric bodies represented by Formula C are shown in Table 15.

TABLE 15

*Effects of platen temperature on degree of cross-linking of polymer #289 (5 P.H.R. of perfluoroglutarodiamidine monomer for 15 min.)*

| Example | Platen Temperature (° F.) | Degree of Cross-Linking (Percent Acetone Insoluble) |
|---|---|---|
| 59 | 400 | 39.0 |
| 60 | 500 | 45.3 |
| 61 | 600 | 69.9 |

EXAMPLES 62-64

These examples illustrate the effects of heating time on the degree of crosslinking produced by amidino chemicals in particular polymeric species represented by Formula C.

TABLE 16

*Effects of heating time on degree of cross-linking of polymers 280 and 289 (5 P.H.R. of perfluoroglutarodiamidine monomer at 500° F.)*

| Examples | Polymer | Heating Time (min.) | Degree of Cross-Linking (Percent Acetone Insoluble) |
|---|---|---|---|
| 60 | 289 | 15 | 45.3 |
| 52 | 289 | 30 | 45.6 |
| 63 | 289 | 60 | 55.1 |
| 55 | 289 | 120 | 66.6 |
| 64 | 280 | 120 | 82.0 |

EXAMPLES 65-69

These examples illustrate the influence of amido chemical concentrations on the degree of cross-linking produced in particular polymeric species represented by Formula C. Example 39 is presented for comparison purposes only.

TABLE 17

*Effects of adipamide concentration on degree of cross-linking of polymer #289 (500 F. for 30 min.)*

| Example | Reagent Concentration (P.H.R.) | Degree of Cross-Linking (Percent Acetone Insoluble) |
|---|---|---|
| 39 | 0.0 | 34.9 |
| 65 | 2.5 | 43.5 |
| 66 | 5.0 | 52.7 |
| 67 | 10.0 | 53.3 |
| 68 | 15.0 | 59.0 |
| 69 | 20.0 | 60.1 |

EXAMPLES 70 AND 71

Table 18 illustrates the effects of temperature on the degree of crosslinking produced by amido compounds in particular polymeric species represented by Formula C.

TABLE 18

*Effects of platen temperature on degree of cross-linking of polymer No. 289 (5 P.H.R. of adipamide for 30 min.)*

| Examples | Platen Temperature (° F.) | Degree of Cross-Linking (Percent Acetone Insoluble) |
|---|---|---|
| 70 | 400 | 38.8 |
| 66 | 500 | 52.7 |
| 71 | 600 | 74.9 |

EXAMPLES 72-75

These examples show the influence of heating time on the degree of crosslinking produced by amido chemicals in particular polymeric bodies represented by Formula C.

TABLE 19

*Effects of heating time on degree of cross-linking of polymer No. 289 (5 P.H.R. of adipamide at 500° F.)*

| Example | Polymer | Heating Time (min.) | Degree of Cross-Linking (Percent Acetone Insoluble) |
|---|---|---|---|
| 72 | 289 | 15 | 49.1 |
| 66 | 289 | 30 | 52.7 |
| 73 | 289 | 45 | 53.1 |
| 74 | 289 | 60 | 53.4 |
| 75 | 280 | 60 | 55.8 |

EXAMPLES 76–78

The influence of nitrilo compounds on the degree of crosslinking of particular polymeric species represented by Formula C is illustrated in Table 20. Examples 1 and 27 are given for comparison purposes only.

TABLE 20
*Cross-linking properties of dinitrile compounds*

| Examples | Polymer | Reagent (5 P.H.R.) | Cure Time (min.) | Cure Temperature (° F.) | Degree of Cross-Linking (Percent Acetone Insoluble) |
|---|---|---|---|---|---|
| 1 | 289 | None | 15 | 500 | 32.2 |
| 76 | 289 | Malononitrile | 15 | 500 | 40.9 |
| 77 | 289 | Adiponitrile | 15 | 500 | 43.3 |
| 27 | 280 | None | | 75 | 40.5 |
| 78 | 280 | Adiponitrile | 15 | 500 | 42.6 |

EXAMPLES 79–82

These examples illustrate the effects of nitrilo compound concentrations on the degree of crosslinking of particular polymer bodies represented by Formula C. Example 1 is given for comparison purposes only.

TABLE 21
*Effects of adiponitrile concentration on degree of crosslinking of polymer No. 289 (500° F. for 15 min.)*

| Example | Reagent Concentration (P.H.R.) | Degree of Cross-Linking (Percent Acetone Insoluble) |
|---|---|---|
| 1 | 0.0 | 32.2 |
| 79 | 2.5 | 37.7 |
| 77 | 5.0 | 43.3 |
| 80 | 10.0 | 48.3 |
| 81 | 15.0 | 41.0 |
| 82 | 20.0 | 42.5 |

EXAMPLES 83 AND 84

Table 22 illustrates the effects of temperature on the crosslinking by nitrilo compounds of particular polymeric bodies represented by Formula C.

TABLE 22
*Effects of platen temperature on degree of cross-linking of polymer 289 (5 P.H.R. adiponitrile for 15 min.)*

| Examples | Platen Temperature (° F.) | Degree of Cross-Linking (Percent Acetone Insoluble) |
|---|---|---|
| 83 | 400 | 33.2 |
| 77 | 500 | 43.3 |
| 84 | 600 | 50.8 |

EXAMPLES 85 AND 86

These examples show the influence of heating time on the degree of crosslinking produced by nitrilo compounds in particular polymeric species represented by Formula C.

TABLE 23
*Effects of heating time on degeree of cross-linking of poylmer No. 289 (5 P.H.R. of adiponitrile at 500° F.)*

| Examples | Heating Time (min.) | Degree of Cross-Linking (Percent Acetone Insoluble) |
|---|---|---|
| 77 | 15 | 43.3 |
| 85 | 60 | 43.7 |
| 86 | 120 | 44.9 |

The di- or polyfunctional amino, epoxido, isocyanato, amidino, amido, and nitrilo compounds may be milled into the rubber materials defined above without other additions for the purpose of cross-linking. This rubber-like polymer containing the cross-linking agent is heated at 400 to 600° F., for 5 to 180 minutes in a hydraulic press.

It is apparent from the foregoing that:

Perfluorocarbonamidine polymers 280 and 289 are cross-linked by di- and polyfunctional chemicals such as aryl and alkyl diamines, perfluoroglutarodiamidine monomer, diamides, epoxides, dinitriles, and diisocyanates.

With an increase in cross-linking, the product becomes harder, and therefore, one will select the degree of cross-linking that will give the degree of hardness desired for any particular use. The pressure of curing does not appear to be material so long as it is substantial and keeps the press closed.

It will be understood that various changes in the details, steps, conditions, and materials, which have been herein described in order to explain the nature of the invention, may be made by those skilled in the art within the principle and scope of the invention, as expressed in the appended claim.

We claim:

A polymer having ultra high, heat-resistant, dielectric properties consisting of the cross-linked co-condensation product of the monomers $$\begin{array}{c} HN \\ H_2N \end{array} C-(CF_2)_n-C \begin{array}{c} NH \\ NH_2 \end{array}$$

and $$F_3C-(CF_2)_m-C \begin{array}{c} NH \\ NH_2 \end{array}$$

where $n$ is one of 2, 3, and 4 and $m$ is one of 2 and 3, and a cross-linking agent selected from the group consisting of p-phenylenediamine
triethylenetetramine
N,N'-dimethyl-p-phenylenediamine
benzidine
monohydroxyethyltrihydroxypropylethylenediamine
hexamethylenediamine carbamate
1,2-epoxyethyl benzene
dicyclopentadiene dioxide
limonene dioxide
dipentene dioxide
α-pinene oxide
diphenylmethane-4,4'-diisocyanate
3,3'-dimethyldiphenylmethane-4,4'-diisocyanate
adipamide
succinamide
malononitrile
glutaronitrile.

(References on following page)

References Cited by the Examiner

UNITED STATES PATENTS

| | | | |
|---|---|---|---|
| 3,014,893 | 12/1961 | Susman et al. | 260—47 |
| 3,086,946 | 4/1963 | Brown | 260—2 |

FOREIGN PATENTS

| | | |
|---|---|---|
| 145,748 | 6/1962 | U.S.S.R. |

OTHER REFERENCES

Brown: "Conference on High Temperature Polymer and Fluid Research," WADC Technical Report 59–427, AD No. 234–424, pp. 155–160, Armed Services Technical Information Agency, Arlington 12, Va., 1/60.

SAMUEL H. BLECH, *Primary Examiner.*

MURRAY TILLMAN, *Examiner.*